United States Patent
Clochard et al.

(10) Patent No.: US 11,110,799 B2
(45) Date of Patent: Sep. 7, 2021

(54) OPTICAL-EFFECT TOUCHPAD ON A STEERING WHEEL FOR FINGER DETECTION

(71) Applicants: CONTINENTAL AUTOMOTIVE FRANCE, Toulouse (FR); CONTINENTAL AUTOMOTIVE GMBH, Hanovre (DE)

(72) Inventors: Pascal Clochard, Chevreuse (FR); Jérôme Wroblewski, Thil (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 11 days.

(21) Appl. No.: 16/642,463

(22) PCT Filed: Sep. 3, 2018

(86) PCT No.: PCT/FR2018/052146
§ 371 (c)(1),
(2) Date: Feb. 27, 2020

(87) PCT Pub. No.: WO2019/048764
PCT Pub. Date: Mar. 14, 2019

(65) Prior Publication Data
US 2020/0254880 A1    Aug. 13, 2020

(30) Foreign Application Priority Data
Sep. 5, 2017   (FR) ...................................... 1758166

(51) Int. Cl.
*B60K 37/06*    (2006.01)

(52) U.S. Cl.
CPC ........ *B60K 37/06* (2013.01); *B60K 2370/128* (2019.05); *B60K 2370/133* (2019.05);
(Continued)

(58) Field of Classification Search
CPC .............. B60K 37/06; B60K 2370/782; B60K 2370/146; B60K 2370/1464;
(Continued)

(56) References Cited

U.S. PATENT DOCUMENTS 9,092,093 B2 *   7/2015   Jubner ................ G06F 3/04883
9,238,409 B2 *   1/2016   Lathrop ................ B60K 37/06
(Continued)

FOREIGN PATENT DOCUMENTS

| DE | 102011112568 A1 | 3/2013 |
| FR | 3028222 A1 | 5/2016 |
| WO | 2016/150572 A1 | 9/2016 |

OTHER PUBLICATIONS

International Search Report, dated Mar. 12, 2018, from corresponding PCT application No. PCT/FR2018/052146.

*Primary Examiner* — Christopher E Leiby
(74) *Attorney, Agent, or Firm* — Nixon & Vanderhye (57) ABSTRACT

A system for detecting command gestures made by a finger of a driver of a motor vehicle, the system including an interface pad, a light source that emits in the infrared toward the pad, an imaging sensor, for capturing images steered by the pad away from the driver, with a base frame and a movable plate, an optical zone of interest seen by the imaging sensor being defined at the interface between the base frame and the plate, the pad including an elastic deformable seal interposed between the base frame and the movable plate, the seal being absorbent at the optical wavelengths of interest, the pad including a reflective strip behind the seal from the point of view of the camera, so that the seal forms a zone that appears dim to the camera, the size of the dim zone depending on the pressure exerted on the plate.

20 Claims, 5 Drawing Sheets

(52) U.S. Cl.
CPC ............ *B60K 2370/146* (2019.05); *B60K 2370/1464* (2019.05); *B60K 2370/21* (2019.05); *B60K 2370/23* (2019.05); *B60K 2370/345* (2019.05); *B60K 2370/782* (2019.05)

(58) Field of Classification Search
CPC ......... B60K 2370/345; B60K 2370/21; B60K 2370/128; B60K 2370/23; B60K 2370/133
See application file for complete search history.

(56) References Cited

U.S. PATENT DOCUMENTS

| | | | | |
|---|---|---|---|---|
| 9,855,888 | B1* | 1/2018 | Dellock | H05B 33/22 |
| 10,482,730 | B2* | 11/2019 | Takeda | G06F 3/016 |
| 10,671,220 | B2* | 6/2020 | Champinot | B60Q 1/1484 |
| 10,928,935 | B2* | 2/2021 | Clochard | B62D 1/046 |
| 2005/0129273 | A1* | 6/2005 | Pryor | G06F 3/01 |
| | | | | 382/103 |
| 2005/0189159 | A1* | 9/2005 | Weber | B60R 21/01542 |
| | | | | 180/315 |
| 2008/0024463 | A1* | 1/2008 | Pryor | B60R 11/0235 |
| | | | | 345/175 |
| 2010/0201652 | A1* | 8/2010 | Caliskan | H04M 1/0266 |
| | | | | 345/177 |
| 2014/0081521 | A1* | 3/2014 | Frojdh | G01C 21/3664 |
| | | | | 701/36 |
| 2014/0090505 | A1* | 4/2014 | Okuyama | G06F 3/0219 |
| | | | | 74/485 |
| 2015/0116721 | A1* | 4/2015 | Kats | G02B 5/286 |
| | | | | 356/454 |
| 2018/0292949 | A1* | 10/2018 | Champinot | H03K 17/9627 |
| 2018/0308325 | A1* | 10/2018 | Takeda | G08B 6/00 |
| 2020/0348771 | A1* | 11/2020 | Clochard | G06F 3/03547 |
| 2021/0063612 | A1* | 3/2021 | Gorodetsky | B32B 7/04 |

\* cited by examiner

OPTICAL-EFFECT TOUCHPAD ON A STEERING WHEEL FOR FINGER DETECTION

BACKGROUND OF THE INVENTION

Field of the Invention

The present invention relates to the touchpads used on a steering wheel of a motor vehicle. More particularly, it relates to optical-effect touchpads for detecting finger gestures and/or touches by means of a standard camera, or more generally an imaging sensor.

Description of the Related Art

It is already well known to place control buttons in the spokes of the steering wheel that connect the central portion to the rim of the steering wheel, for example in order to control communication and/or audio functions or even the speed limiting/regulating function.

However, in the context of increasingly elaborate human-machine interfaces, this solution lacks flexibility because the buttons are dedicated. In addition, this requires a cabled electrical connection between the steering wheel and the rest of the vehicle.

Specifically, it is preferable to use solutions that do not require the presence of electronics inside the steering wheel and that do not require a cabled electrical connection between the steering wheel (which rotates) and the dashboard.

Moreover, it is highly recommendable for reasons of road safety to permanently keep the hands on the steering wheel or in immediate proximity to the latter, this providing motivation to place, on the steering wheel, human-machine interfaces that are accessible to the fingers of the driver when his hands are holding the rim, this objective however not always being compatible with the aforementioned constraints.

It has already been proposed to detect, by means of the type of camera referred to as a 3D camera, certain gestures made by the fingers of the driver when the fingers of the hand of the driver are located on a specific transparent pad in the vicinity of the steering wheel, as for example described in document FR 3 028 222. However, according to the proposed solution, it is necessary to make use of a specific camera (referred to as a "3D" camera) capable of measuring the distance with respect to each of the points of the objects seen in the field of view; this type of equipment is expensive. Moreover, it is very difficult to obtain a sufficient precision to determine whether the finger is touching the pad or whether the finger is not touching the pad, which difference is however very important from the point of view of the meaning of the gestures made by the fingers of the driver.

SUMMARY OF THE INVENTION

Therefore, the inventors have identified a need to provide other ways of achieving an interface for detecting command gestures on a touchpad in a steering wheel, without electronics in the steering wheel and without a cabled electrical connection between the steering wheel and the dashboard.

To this end, a system is proposed for detecting command gestures made by at least one finger of a driver of a motor vehicle, the system comprising:

at least one interface pad located in proximity to the rim of the steering wheel,
at least one light source that emits an optical beam mainly in the near-infrared band toward the interface pad,
an imaging sensor, for capturing at least images steered by the interface pad away from the driver.

In said detecting system, the interface pad comprises a base frame and a movable plate that is movable between a rest position and at least one activation position obtained by pressing one of the fingers on the movable plate, the base frame and the movable plate lying generally in a reference plane XY and having a small thickness in the direction Z perpendicular to said reference plane XY, an optical zone of interest seen from the imaging sensor being defined at the interface between the base frame and the movable plate.

The detecting system is noteworthy in that the interface pad comprises at least one elastic deformable seal interposed between the base frame and the movable plate, the elastic deformable seal being generally absorbent at the optical wavelengths of interest, the interface pad comprising a reflective strip behind the elastic deformable seal from the point of view of the imaging sensor, so that the elastic deformable seal forms a dim zone on the optical path in the optical zone of interest seen by the imaging sensor, the size of the dim zone depending on the pressure exerted on the movable plate.

By virtue of such a system, it is possible to detect the strength of the force exerted on the movable plate, and not only an all-or-nothing action. The camera (imaging sensor) thus captures a zone of almost constant brightness the geometry of which is however dependent on the deformation of the elastic deformable seal and therefore on the force exerted on the movable plate.

The zone of almost constant brightness may take the form of a continuous peripheral strip or the form of a plurality of separate zones.

Certain specific finger movements, such as a pseudo "click" or a pseudo "double-click", may thus be detected very reliably, with a reliability higher than that of prior-art image-processing operations that analyze how blurry the finger appears through the interface pad.

The proportionality of the deformation also allows a soft press to be distinguished from a harder press.

Advantageously, the driver keeps his hands on or in immediate proximity to the steering wheel, and may make, on the interface pad, control gestures while keeping good control of the steering wheel.

The imaging sensor is for example a video camera; generally, it is possible to speak of an optical sensor. The camera may be a conventional video camera or a 3D video camera as will be described in detail below.

The detected finger is a thumb, an index finger, a middle finger or another finger.

In various embodiments of the invention, one or more of the following arrangements may also be used.

According to one advantageous feature, the elastic deformable seal becomes wider when a finger presses on the movable plate in the direction of the camera.

This corresponds to the case where the movable plate is pressed with the thumb. The elastic deformable seal is squashed, its height decreases and its width increases and thus the dim zone corresponding to the width of the elastic deformable seal enlarges as a result, this being able to be easily perceived and analyzed by processing of the images captured by the camera.

According to one optional additional feature, the elastic deformable seal becomes narrower when a finger presses on the movable plate in the direction of the driver.

This corresponds to the case where the movable plate is pulled by the index or middle finger in the direction of the driver. The elastic deformable seal is stretched, its height increases and its width decreases and thus the dim zone corresponding to the width of the elastic deformable seal diminishes as a result, this being able to be easily perceived and analyzed by processing of the images captured by the camera.

According to one aspect, the elastic deformable seal may have a round cross section at rest. As this type of elastic seal is extremely commonplace, O-rings for example, its cost is advantageously low, and therefore the solution is particularly economical.

According to one aspect, provision may be made for holding clips in order to hold the movable plate inside the base frame and optionally to exert a slight pre-stress on the one or more elastic seals. Thus, assembly of the movable plate in the base frame proves to be particularly simple; this also provides a solution that makes an adhesive bonding operation redundant.

According to one aspect, the elastic deformable seal may have at rest an ovoid general cross section with two radially opposite flats. By virtue of the flats, a stable areal interface is obtained with respect to the base frame and the movable plate; this permits an adhesive bonding solution to be used in the location of this areal interface.

According to one aspect, the elastic deformable seal is adhesively bonded in the zone of the flats on the one hand to the movable plate and on the other hand to the base frame. By virtue of such adhesive bonding, an operation whereby traction is applied to the elastic deformable seal and the latter is elongated is permitted, this corresponding to the action of pulling on the plate or pushing.

According to one optical possibility, bright zones and dim zones are created as seen by the camera (imaging sensor), the bright zones and the dim zones being separated by a limit, and this limit is moved proportionally to the force exerted on the movable plate.

Advantageously, the variation in the luminous echo is easily detectable by the camera. A "finger press" causes the elastic deformable seal to be squashed, and therefore a geometric increase in the dim zone and a geometric decrease in the width of the one or more bright (at the frequencies used) zone(s) seen by the camera. According to one option, the elastic deformable seal has a hollow core.

According to a similar option, the elastic deformable seal is formed by a porous material with open cells. This allows the elastic deformable seal to be deformed and squashed more easily.

According to one option, the base frame forms a peripheral zone around said movable plate. The movable plate is thus protected by the frame and does not risk being damaged; provision may also be made for a delineation by a pattern visible to the driver, who intuitively expects to find the activation zone in the central zone of the interface pad.

According to one option, the one or more elastic deformable seals may extend right around the perimeter of the movable plate, the elastic deformable seal being interposed between the base frame and the movable plate. In other words, the elastic deformable seal extends all the way around the base frame. Image processing in the camera easily allows such a connected geometric shape to be identified and the position and orientation thereof to be determined.

According to one option, the light source and the video camera are arranged in proximity to each other; thus a biasing effect and a possible parallax effect are avoided.

According to one option, the light source and the imaging sensor are arranged in the vicinity of or in an instrument panel of the vehicle; the integration is thus facilitated.

According to one option, the imaging sensor in question is also used for the drowsiness detection function; this makes it possible to use a single camera for the interface pad and the "drowsiness detection" function.

According to one option, the imaging sensor is a conventional video camera, i.e. without three-dimensional function; thus, a moderate cost, a choice of a high number of variants and a very small bulk are achieved.

According to one option, provision may be made for a push-button effect. This increases intuitiveness and therefore gives an impression of quality.

According to one option, the movable plate is transparent at least to infrared light, so that the imaging sensor is able to detect movements of a finger inside the zone covered by the movable plate through the movable plate.

According to one option, the light source emits in the 850-940 nm near-infrared band, and does not emit in the visible band. Thus, no discomfort is experienced by the driver or the other occupants of the vehicle, who see no spot of light in the instrument panel. Moreover, the emitted power in any case remains below the thresholds of ocular discomfort and/or hazard.

According to one option, provision is made for an elastic return to the rest position, said return preferably being achieved via the intrinsic resilience of the elastic deformable seal.

According to one option, the elastic deformable seal is an extruded silicone seal.

BRIEF DESCRIPTION OF THE DRAWINGS

Other features and advantages of the invention will become apparent from the following description, which is given by way of nonlimiting example with reference to the appended drawings, in which.

DESCRIPTION OF THE PREFERRED EMBODIMENTS

In the various figures, the same references have been used to reference identical or similar elements. For the sake of clarity of the description, some elements are not shown to scale.

Figure 1:
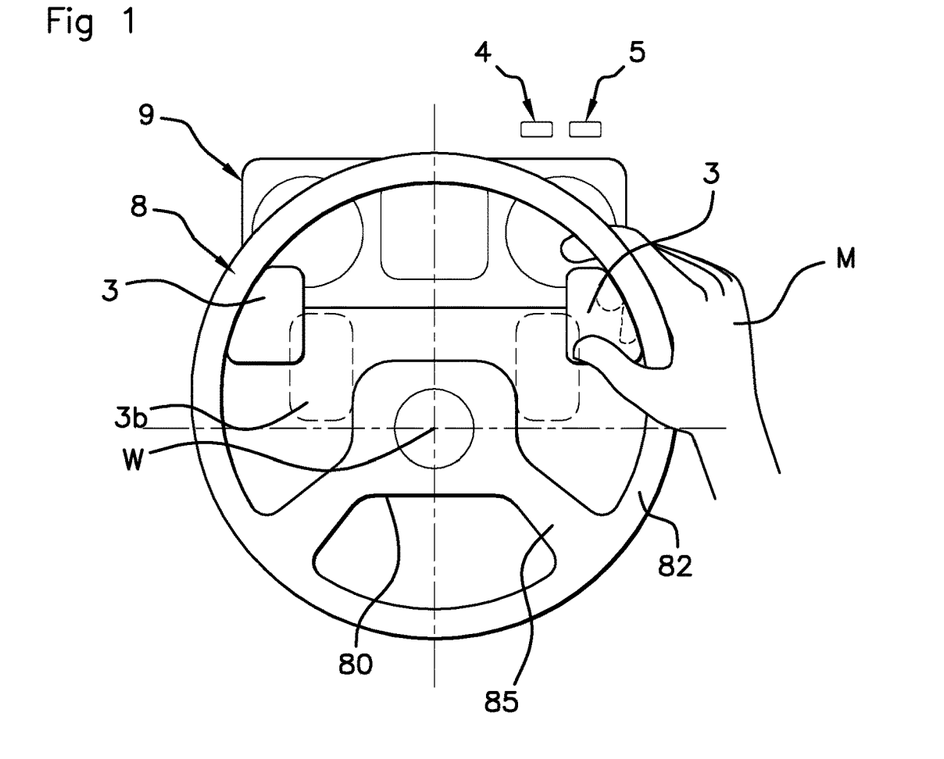
FIGS. 1 and 2 schematically show, face-on and in profile, respectively, a detecting system according to the present invention.

FIG. 1 shows a system for detecting command gestures made by a thumb P of a driver of a motor vehicle on an element that generally belongs to the steering wheel 8 and that is referred to below as an interface pad 3 (described in detail below).

Below, the thumb of the hand M is denoted P, and all of the fingers (index finger, middle finger, ring finger, little finger) are each denoted F.

The illustrated steering wheel 8 is of the type comprising two spokes 85 but, of course, the number of spokes has no bearing on the present invention, it may be 3, 4 or even 1 (case of a single-spoke steering wheel).

The steering wheel 8 rotates about an axis denoted W and comprises a hub and a rim 82 as known per se. The rim may be shifted off-center with respect to the axis W, upwards in straight-line configuration as illustrated in FIG. 1.

It is not excluded for the hub to comprise a central block equipped with an air bag system; however, in one preferred variant, the airbags are located elsewhere in other portions of the cockpit and the steering wheel 8 is devoid of any electrical/electronic systems.

Behind the steering 8 is positioned an instrument panel 9 as known per se. In this panel, for example, provision is made for a light source 4 that mainly emits in the near-infrared domain, and an imaging sensor 5. This imaging sensor 5 is also referred to as a photographic sensor.

The images are captured by the imaging sensor 5 at a rate of a plurality of images per second, for example between 5 images per second and 25 images per second. This imaging sensor 5 may be a video camera, for example one based on a (color or monochromic) CCD sensor as known per se.

Preferably, the camera is of a conventional two-dimensional type unable to measure depth. In other words, it is not a question of a "3D" camera, this type of camera also sometimes being referred to as a time-of-flight camera.

However, the use of such a "3D" camera is not excluded in the context of the proposed solution.

In the example illustrated in FIG. 1, there are two interface pads 3, each attached to the rim 82 of the steering wheel 8; of course, the interface pads 3 may also be connected to other structural portions of the steering wheel 8, such as for example the central portion 80, the pads then being located on either side and in proximity to the central portion 80 (reference 3b in FIG. 1).

The light source 4 emits an optical beam mainly in the infrared band toward the steering wheel 8, and in particular toward the interface pads 3.

A plurality of separate light sources could be used. A plurality of cameras could also be used. However, preferably, the system is able to use a single camera, and even the same camera already used for the drowsiness detection function.

Preferably, the light source 4 and the video camera are arranged in the vicinity of each other.

Alternatively, the light source 4 could be not be positioned in the instrument panel 9 but in the vicinity of the latter; the same goes for the camera, which could not be positioned in the instrument panel 9 but in the vicinity of the latter, such as for example on the steering column of the steering wheel.

Figure 2:
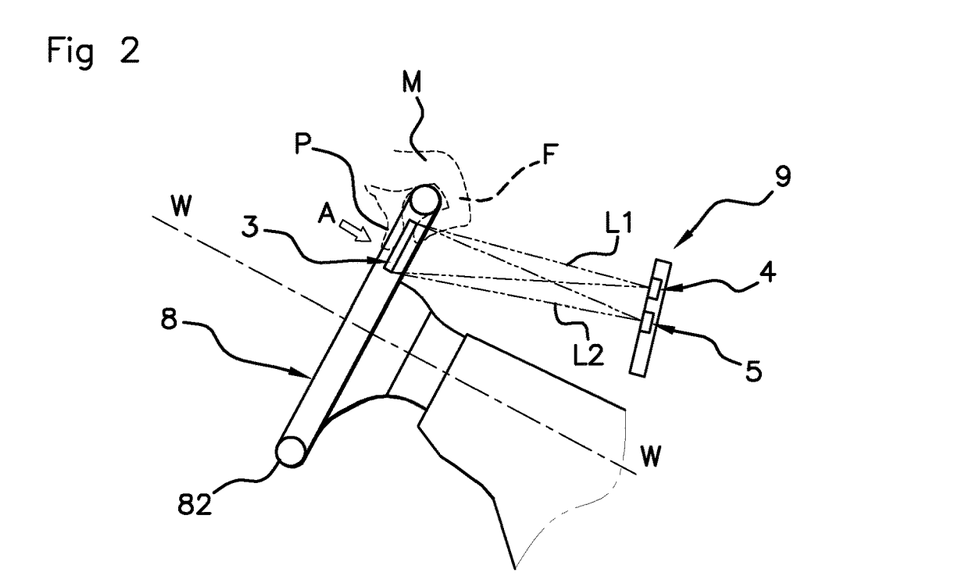

The light exiting from the light source 4 is emitted in the direction of the steering wheel 8 and of the driver (path denoted L1 in FIG. 2). Preferably, this light source 4 does not emit in the visible domain but mainly in the near-infrared domain. Generally, the wavelength band [800 nm-1100 nm] is chosen, this band defining the near-infrared domain.

According to one particular option, the wavelength band [850 nm-940 nm] is chosen.

The light beam emitted by the light source 4 will preferably have a limited power, and in any case a power below accepted thresholds of danger to the driver at the near-infrared wavelengths used.

Operation is ensured whatever the exterior ambient light conditions, i.e. not only under dark or dimpsy conditions, for example when driving at night, but also under daytime conditions and even under intense sunlight; the "hood-down convertible" version is also compatible and taken into consideration.

The video camera (imaging sensor 5) possesses a field of view that at least encompasses the possible positions of the interface pads 3 in the steering wheel 8. Here, it is the images captured by the camera of the zone of the interface pads 3 that are of interest, and in particular the light rays emitted by the light source 4 and returned to the objective of the camera via reflection from the interface pads 3 (path denoted L2 in FIG. 2).

Figure 3:
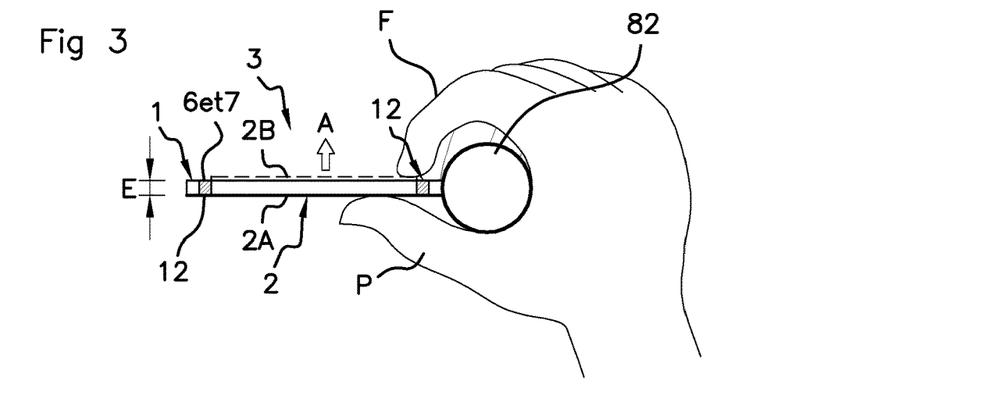
FIG. 3 shows a transverse cross-sectional view through the rim of the steering wheel with the interface pad, and a pushing action.

The interface pad 3 comprises a base frame 1 that is securely fastened to the steering wheel 8 and a movable plate 2 (see FIG. 3). The base frame 1 and the movable plate 2 lie generally together in a reference plane, denoted XY, and have a thickness E in the direction Z perpendicular to said plane XY.

A small thickness E, for example a thickness smaller than 8 mm, and even, preferably, smaller than 5 mm will be selected (design refinement and lightness).

The interface pad 3 has a front face 2A that is visible to the driver and a back face 2B that is not visible to the driver.

The base frame 1 forms the peripheral zone of said interface pad 3 and encircles the movable plate 2, which lies generally in the central zone of the interface pad 3.

The movable plate 2 is movable between a rest position P0, which is adopted in the absence of exterior stress, and especially in the absence of a press of a finger, and at least one first activation position P1 that is obtained by pressing the finger P forward (arrow "A" in the figures).

This movement is made possible by virtue of the presence of a hinging zone 12 that forms the mechanical and incidentally optical interface between the movable plate 2 and the base frame 1.

Figure 5:
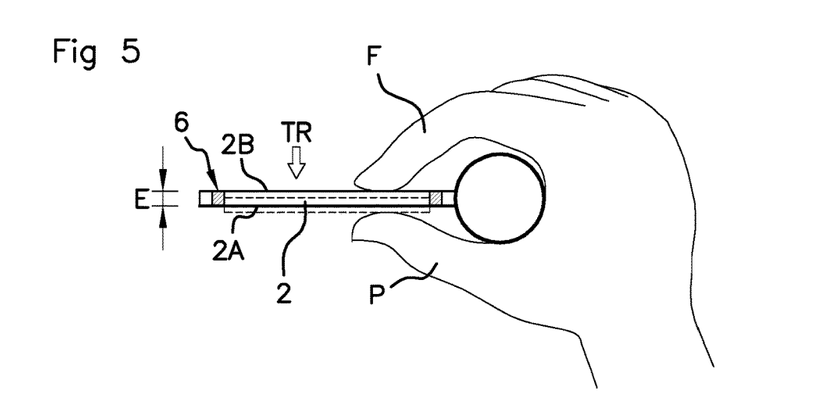
FIG. 5 is analogous to FIG. 3 and shows a transverse cross-sectional view through the rim of the steering wheel with the interface pad, and a pulling action.

According to one optional feature, provision is made for the opposite activation direction and in particular a second activation position P2 obtained by pressing the finger F toward the driver (arrow "TR" in the figures), i.e. in practice a traction applied by the index finger, the middle finger, the ring finger or the little finger (one or a plurality of these fingers).

Figure 4:
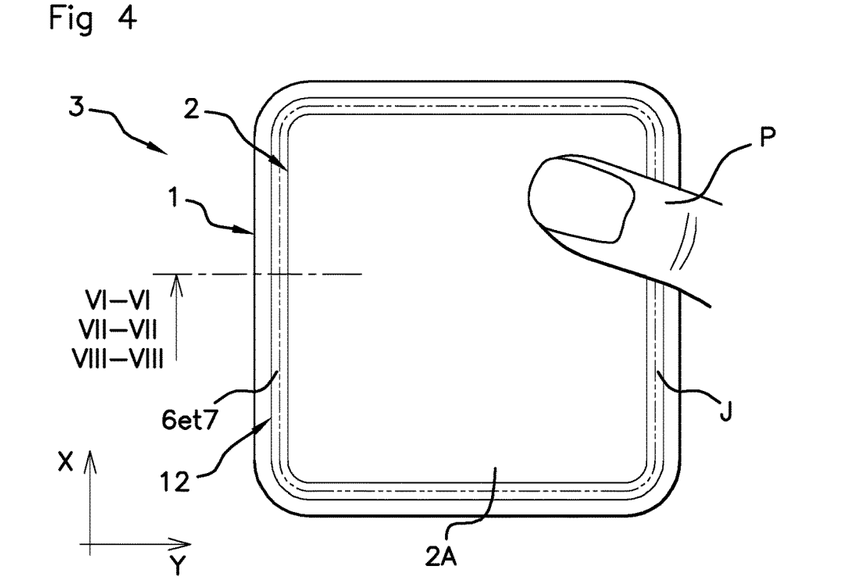
FIG. 4 shows, in more detail, a face-on view of the interface pad.

As in the example illustrated in FIG. 4, the hinging zone 12 may form a closed ring, i.e. completely encircle the movable plate 2. In the example illustrated in the figures, the movement used to displace the movable plate 2 is a quasi-translation along the axis Z.

According to other alternative solutions, the hinging zone could be different: a hinge could be located on one side and the inclined sides located opposite the hinge, the movement being a pivot about the hinge.

According to yet another solution, the movable plate 2 and the base frame 1 may be mechanically coupled as will be described in detail below.

Figure 6A:
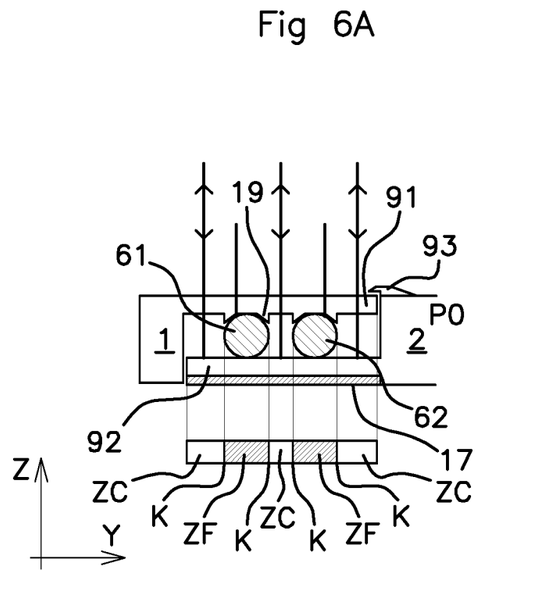
FIGS. 6A and 6B show a more detailed cross-sectional view of a first embodiment cut along the section line VI-VI illustrated in FIG. 4, FIGS. 7A,7B and 7C show a cross-sectional view of a second embodiment cut along the section line VII-VII illustrated in FIG. 4.
Figure 6B:
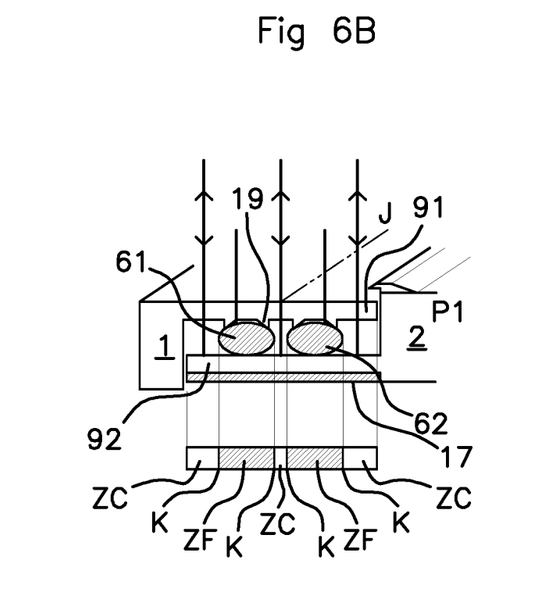

As may be seen in FIGS. 6A and 6B, according to a first embodiment, two elastic deformable seals 61, 62 are interposed in the perpendicular direction Z between a border 91 belonging to the base frame 1 and a border 92 belonging to the movable plate 2; in other words the two elastic deformable seals 61, 62 are sandwiched between the two borders 91 and 92.

As a variant (not shown in the figures) there may, of course, be a single elastic deformable seal instead of two.

Provision may be made for holding clips 93 that, once the movable plate 2 has been inserted into the base frame 1, retain said movable plate 2 and prevent it from being withdrawn. It will be noted that a few discrete holding clips 93 placed on the perimeter of the movable plate 2 are enough.

Each of the elastic deformable seals 61, 62 is preferably made of supple silicone (or another elastic material) having a good elasticity, i.e. a good resilience. Each of the elastic deformable seals is preferably obtained by extrusion.

Each of the elastic deformable seals 61, 62 is opaque (absorbent) to the infrared light rays of interest here.

Each of the elastic deformable seals 61, 62 extends, along its longitudinal axis J, along the interface between the base frame 1 and the movable plate 2, all the way therearound in one particular case or indeed with a discontinuity on one side for example.

In its shape at rest, each of the elastic deformable seals 61, 62 has a round cross section.

It will be noted that in the border 91 belonging to the base frame 1 provision may be made for a sort of groove 19 that allows the elastic deformable seal to be correctly positioned.

Moreover, in the border belonging to the movable plate 2 is arranged a reflective strip 17, the function of which is to direct the light rays (at least those of wavelengths in the near infrared) back toward the camera (the imaging sensor 5).

The reflective strip 70 has a reflective effect, at least on the near-infrared light rays located precisely on the refracted optical path. It may be a question of a catadioptric interface or of a surface that scatters light.

Figure 9:
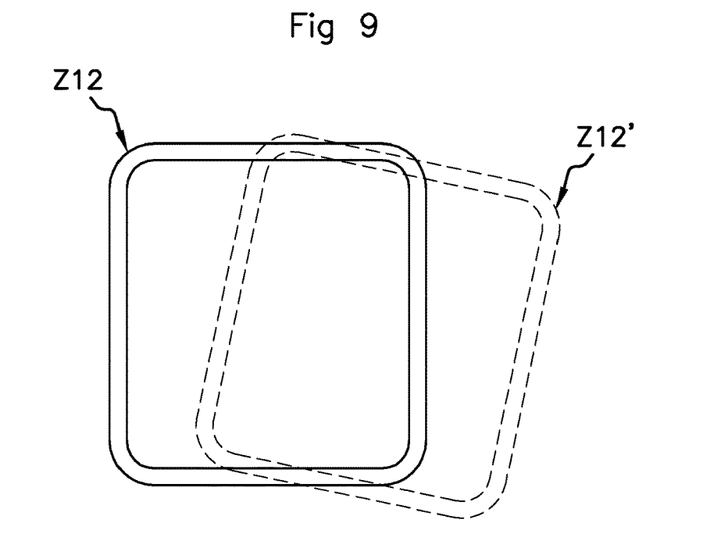
FIG. 9 shows an example of an optical zone of interest seen by the imaging sensor.

The zone of the elastic deformable seals 61, 62 forms an optical zone of interest Z12 seen by the camera (FIG. 9).

In the example illustrated in FIG. 6A, in which no action is being exerted on the movable plate 2 (configuration P0 in the absence of external stress), the elastic deformable seal 61 (62, respectively) is at rest. In the interval between the elastic deformable seals and the sides, the optical path L1, L2 starting at the light source 4 is the following: passage through the border 91, then reflection from the reflective strip 17, and return in the direction of the camera. In the location of the elastic deformable seals, the optical path starting at the light source 4 is absorbed by the elastic deformable seal without substantial reflection, because the material of the seal is opaque.

By virtue of the reflective strip 17, the overall degree of optical return is therefore high, and the bright zones ZC are clearly visible in the images captured by the camera (reference Z12 FIG. 9).

In a first configuration (FIG. 6B), in an activation position P1 obtained by a push of the finger P, the elastic deformable seal 61 is squashed, its height decreases and its width increases and thus the dim zone ZF corresponding to the width of the elastic deformable seal enlarges as a result, this being able to be easily perceived and analyzed by processing of the images captured by the camera. The same goes for the second elastic deformable seal 62.

Therefore, the central bright zone denoted ZC decreases in width whereas the two dim zones ZF on either side are enlarged. The bright zone ZC and the dim zone ZF are separated by a limit denoted K, and this limit or these limits move proportionally depending on the strength of the press A on the movable plate 2. Therefore, it will be understood that the limit K between the bright zone ZC and the dim zone ZF moves proportionally to the strength of the force applied to the movable plate 2.

With respect to materials, polycarbonate or PMMA will preferably be chosen for the base frame 1 and for the movable plate 2. Preferably, a material that is transparent in the near infrared will be chosen for the movable plate 2.

As mentioned above, in the absence of external mechanical stresses, the movable plate 2 is returned to the rest position P0 by returning means. In the illustrated example, it is the resilience of the elastic deformable seals 61, 62 that creates the force of return to the rest position P0. It will be noted that a solution based on a return means of spring type is not excluded.

Figure 7A:
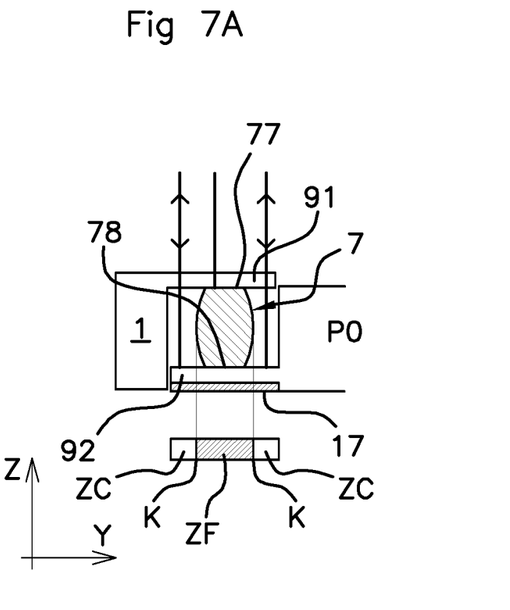
Figure 7B:
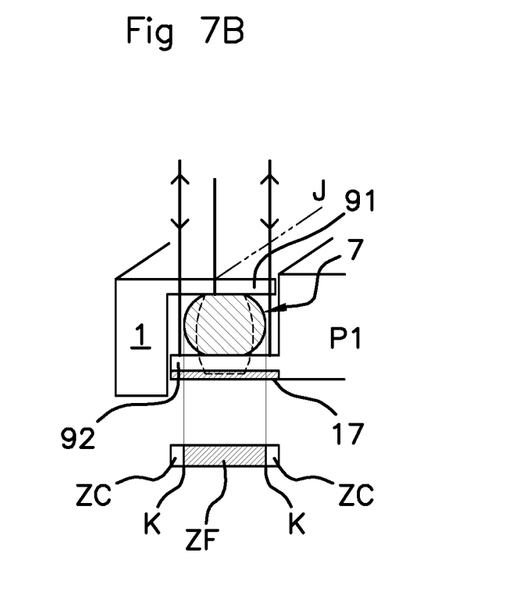
Figure 7C:
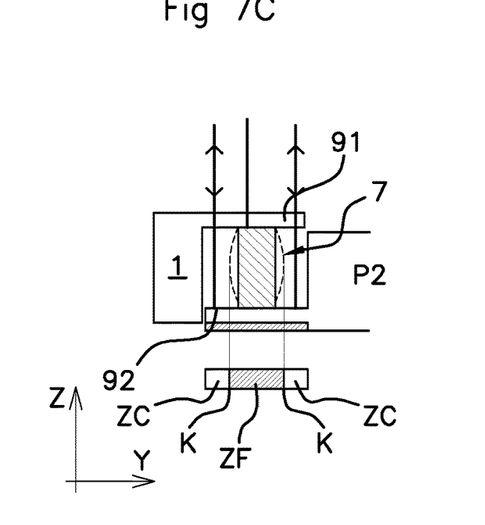

FIGS. 7A, 7B and 7C illustrate a variant of the configuration depicted in FIGS. 6A and 6B; in this variant, the user may push the movable plate 2 and he may also pull on the movable plate 2—both directions are possible.

Most of the elements will not be described again because only the arrangement and operation of the notch are different. The difference essentially relates to the shape of the elastic deformable seal 7 and to the way in which it is attached to the movable plate 2 and to the base frame 1.

In the present case, the cross section of the elastic deformable seal 7 is generally ovoid with two radially opposite flats, one 78 bearing against the border 92 belonging to the movable plate 2 and the other 77 bearing against the border 91 belonging to the base frame 1.

The curved sides of the ovoid shape enable an operation in "pull" and "push" mode; when a push is applied, the elastic deformable seal squashes and the curvature of the sides increases; when the inverse is true, the curvature of the sides decreases.

FIG. 7A shows the configuration in the rest position P0, namely without external stress.

As above, there are two bright zones ZC and one dim zone ZF and limits K between the bright zones ZC and the dim zone ZF.

When the movable plate 2 is pressed, as illustrated in FIG. 7B, the elastic deformable seal 7 is squashed, its height decreases and its width increases and thus the dim zone ZF corresponding to the width of the elastic deformable seal 7 enlarges as a result, this being able to be easily perceived and analyzed by processing of the images captured by the camera. The limits K get further from the axis of the elastic deformable seal J.

When the movable plate 2 is pulled on (position P2, as illustrated in FIG. 7C), the elastic deformable seal 7 is stretched, its height increases and its width decreases and thus the dim zone ZF corresponding to the width of the elastic deformable seal 7 diminishes as a result, this being able to be easily perceived and analyzed by processing of the images captured by the camera. The limits K get closer to the axis of the elastic deformable seal J.

The deformation, which is continuous and proportional, depends on the applied force, and therefore the respective sizes of the bright and dim zones ZC, ZF and the position of the limit K vary proportionally depending on the applied force, these elements being decoded by the analysis of the images captured by the camera. Advantageously, an almost symmetric response to the action of pushing and the action of pulling is therefore obtained.

Figure 8:
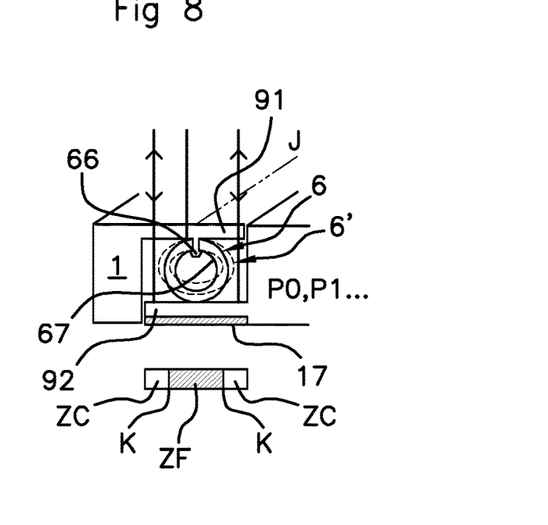
FIG. 8 shows a cross-sectional view of a third embodiment cut along the section line VIII-VIII illustrated in FIG. 4.

According to a third embodiment shown in FIG. 8, the elastic deformable seal 6, which is obtained by extrusion, comprises a hollow core 67 and a longitudinal accommodating slit. On the side of the base frame 1, provision is made for a rib 66 that extends along the axis J of extension of the elastic deformable seal 7. The rib 66 has in cross section the shape of an upside-down mushroom. This rib 66 serves to ensure the elastic deformable seal 7 occupies a predefined position in the space between the base frame 1 and the movable plate 2. This rib 66 permits the elastic deformable seal 7 to be squashed, as illustrated, to the flexed position P1, referenced 6', of the elastic deformable seal.

Regarding this third embodiment, all the elements and features not described in the above paragraph are identical or similar to those described with respect to the first embodiment.

In the configurations illustrated in FIGS. 6A-6B and 7A-7C, with such elastically deformable seals 61, 7, which naturally generate a return force, it is possible to obtain a profile of very small thickness for the interface pad 3; the thickness E may be smaller than 4 mm, or even smaller than 3 mm.

Provision may be made for a push-button effect, which may be intrinsic to the seal or achieved via a separate external means.

FIG. 9 illustrates the zone of contrasts of interest, denoted Z12, that corresponds to all the positions of the points of the inclined edges seen by the camera.

Figure 12:
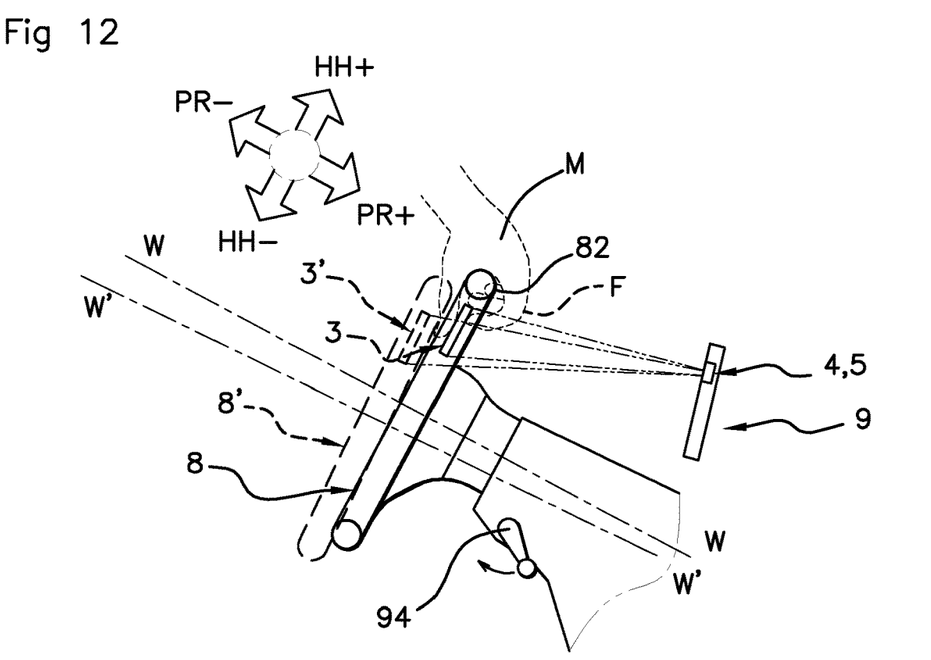
FIG. 12 illustrates the adjustment of the position of the steering wheel.

In conjunction with FIG. 12, it will be understood that the zone of contrasts of interest Z12 may moreover adopt a different position Z12' if the steering wheel 8 is not completely straight; for example, if the driver is on a motorway with a slight curve, the steering wheel angle θ is not equal to zero, nonetheless road-safety conditions permit the driver to interact with an on-board system by virtue of the interface pad 3.

Figure 10:
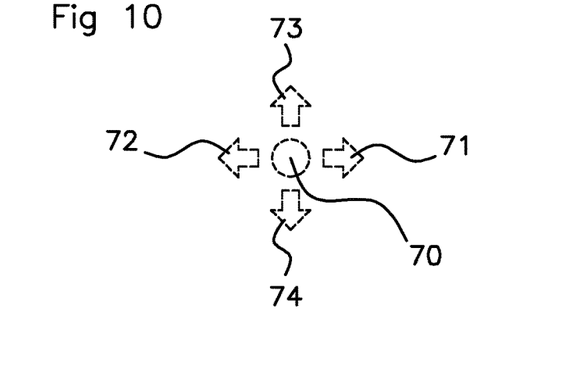
FIG. 10 shows the considered main typical movements of the thumb of the driver.

FIG. 10 illustrates various finger movements typical of a touchscreen human-machine interface: scroll to the right 71, scroll to the left 72, scroll upward 73, scroll downward 74 and "click" 70; the "click" 70 has the particularity that it is the contrast effect observed in the optical zone of interest Z12 that reveals the press and not simply the approach of a finger (analysis of the blurriness or clearness of the image of the finger) as in the prior art. Images captured through the movable plate 2 are analyzed to detect one of the aforementioned movements 71, 72, 73, 74.

Figure 11:
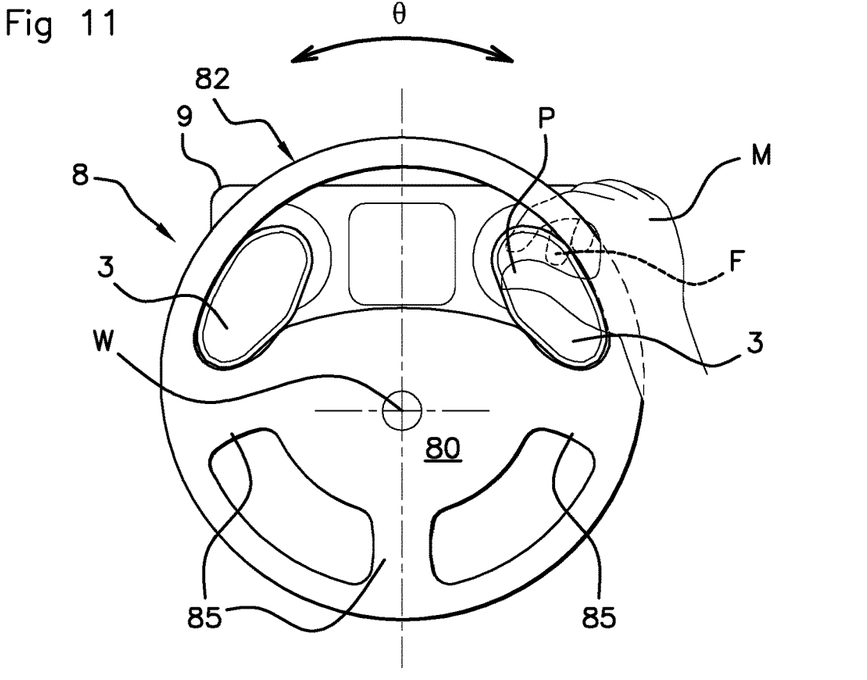
FIG. 11 shows another type of steering wheel and of interface pad.

FIG. 11 is analogous to FIG. 1 and its essential elements are similar and will not be described in detail again. FIG. 11 illustrates different shapes and positions of the interface pads 3.

Typical dimensions for the interface pad 3: 5×5 cm, but any other dimensions compatible with a placement between the rim 82 of the steering wheel 8 and the hub of the steering wheel 8 may be chosen.

Width of the border forming the optical zone of contrasts of interest: 3 to 6 mm.

It will be noted that it is possible to provide a cover plate on the front face 2A, said cover plate being intended to cover the optical and mechanical interface elements between the base frame 1 and the movable plate 2.

It will be noted that the light source 4 may optionally be pulsed and the images analyzed synchronously with the activation of the light source.

Moreover, a conventional system for adjusting the position of the steering wheel 8 comprises an unlocking handle 94 that, when it is activated, permits a depthwise movement in the directions PR+ and PR− and a heightwise movement in the directions HH+ and HH− (see FIG. 12). In the example, one position of the steering wheel 8, W has been shown with solid lines, and another position with dashed lines 8', W'. The interface pad 3 follows the movement and moves to the position 3'. The position of the zone of contrasts may vary, even depthwise, but this does not prevent the contrast effect from manifesting itself as soon as the driver presses on the movable plate 2.

It will be noted that the interface pad 3 contains no electronic components, solely elements participating in an optical function.

Moreover, the movable plate 2 and the base frame 1 could be transparent in the visible domain in order to limit the restriction of the driver's sight through the steering wheel 8.

According to one advantageous aspect, a force's strength is detected. The analysis of the images may use a decision threshold to determine whether the press is sufficient or not to constitute a "click". Furthermore, two decision thresholds may be used to determine whether it is a question of a soft press or of a pronounced press.

According to one advantageous aspect, an asymmetry in the press on the movable plate 2 may be detected; for example, one side may be pressed down further than the opposite side and this difference is reflected in the width of the dim zone and the analysis of the images perceived by the camera allows the side pressed down furthest to be detected.

The invention claimed is:

1. A system for detecting command gestures made by at least one finger (P, F) of a driver of a motor vehicle, the system comprising:
   at least one interface pad (3) located in proximity to the rim of the steering wheel (8),
   at least one light source (4) that emits an optical beam (L1) mainly in the near-infrared band toward the interface pad (3),
   an imaging sensor (5), for capturing at least images steered (L2) by the interface pad (3) away from the driver,
   wherein the interface pad (3) comprises a base frame (1) and a movable plate (2) that is movable between a rest position (P0) and at least one activation position (P1, P2) obtained by pressing one of the fingers (P, F) on the movable plate (2), the base frame (1) and the movable plate (2) lying generally in a reference plane XY and having a small thickness in the direction Z perpendicular to said reference plane XY, an optical zone of interest seen from the imaging sensor being defined at the interface between the base frame (1) and the movable plate (2), wherein the interface pad (3) comprises at least one elastic deformable seal (6; 61, 62; 7) interposed between the base frame (1) and the movable plate (2), the elastic deformable seal (6; 61, 62; 7) being generally absorbent at the optical wavelengths of interest, the interface pad (3) comprising a reflective strip (17) behind the elastic deformable seal (6; 61, 62; 7) from the point of view of the imaging sensor (5), so that the elastic deformable seal (6; 61, 62; 7) forms a dim zone (ZF) on the optical path (L1, L2) in the optical zone of interest seen by the imaging sensor (5), the size of the dim zone (ZF) depending on the pressure exerted on the movable plate (2).

2. The system as claimed in claim 1, wherein the elastic deformable seal (6; 61, 62; 7) becomes wider when a finger (P) presses on the movable plate (2) in the direction of the imaging sensor (5).

3. The system as claimed in claim 2, wherein the elastic deformable seal (6; 61, 62; 7) becomes narrower when a finger (F) presses on the movable plate (2) in the direction of the driver.

4. The system as claimed in claim 1, wherein the elastic deformable seal (61, 62) has a round cross section at rest.

5. The system as claimed in claim 1, wherein the elastic deformable seal (7) has an ovoid general cross section with two radially opposite flats.

6. The system as claimed in claim 5, wherein the elastic deformable seal (7) is adhesively bonded in the zone of the flats, both to the movable plate (2) and also to the base frame (1).

7. The system as claimed in claim 1, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

8. The system as claimed in claim 1, wherein the movable plate (2) is transparent at least to infrared light, so as to be able to detect movements of a finger inside the zone covered by the movable plate (2) through the movable plate (2).

9. The system as claimed in claim 1, wherein the light source (4) emits in the near-infrared band, typically in the wavelength band 850 nm-940 nm, and does not emit in the visible band.

10. The system as claimed in claim 1, wherein provision is made for an elastic return to the rest position.

11. The system as claimed in claim 2, wherein the elastic deformable seal (61, 62) has a round cross section at rest.

12. The system as claimed in claim 3, wherein the elastic deformable seal (61, 62) has a round cross section at rest.

13. The system as claimed in claim 2, wherein the elastic deformable seal (7) has an ovoid general cross section with two radially opposite flats.

14. The system as claimed in claim 3, wherein the elastic deformable seal (7) has an ovoid general cross section with two radially opposite flats.

15. The system as claimed in claim 2, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

16. The system as claimed in claim 3, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

17. The system as claimed in claim 4, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

18. The system as claimed in claim 5, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

19. The system as claimed in claim 6, wherein bright zones (ZC) and dim zones (ZF) are created as seen by the imaging sensor (5), the bright zones (ZC) and the dim zones (ZF) being separated by a limit (K), and this limit (K) is moved proportionally to the force exerted on the movable plate (2).

20. The system as claimed in claim 1, wherein provision is made for an elastic return to the rest position, said return being achieved via the intrinsic resilience of the elastic deformable seal (6; 61, 62; 7).

* * * * *